United States Patent [19]
Takeshima et al.

[11] Patent Number: 5,841,757
[45] Date of Patent: Nov. 24, 1998

[54] OPTICAL DISK HAVING A LARGE STORAGE CAPACITY

[75] Inventors: Hideharu Takeshima, Kanagawa; Hidemi Yoshida, Okayama; Chiga Ueda, Kanagawa, all of Japan

[73] Assignee: Mitsubishi Chemical Corporation, Tokyo, Japan

[21] Appl. No.: 862,386

[22] Filed: May 23, 1997

[30] Foreign Application Priority Data

| May 24, 1996 | [JP] | Japan | ................................... 8-153351 |
| Apr. 7, 1997 | [JP] | Japan | ................................... 9-088142 |
| Apr. 15, 1997 | [JP] | Japan | ................................... 9-097068 |

[51] Int. Cl.$^6$ .................................................. G11B 7/24
[52] U.S. Cl. ..................................... 369/275.3; 369/275.4
[58] Field of Search ............................. 369/275.3, 275.2, 369/58, 44.26, 275.1, 275.4; 386/126

[56] References Cited

U.S. PATENT DOCUMENTS

| 5,418,773 | 5/1995 | Bakx et al. ........................... 369/275.3 |
| 5,592,452 | 1/1997 | Yoshimoto et al. .................. 369/275.3 |
| 5,684,774 | 11/1997 | Yamamuro ........................... 369/275.3 |
| 5,717,683 | 2/1998 | Yoshimoto et al. .................. 369/275.3 |

*Primary Examiner*—Tan Dinh
*Attorney, Agent, or Firm*—Oblon, Spivak, McClelland, Maier & Neustadt, P.C.

[57] ABSTRACT

A magneto-optical disk has a recording film on a substrate for defining a data area. The data area is divided into a plurality of zones in the radial direction, and each zone has a plurality of physical tracks divided into a plurality of sectors along the tracks. Number of sectors per physical track in each zone is increased as viewed toward the outer edge of the disk one by one. The shortest mark length in specified zones in the vicinity of the inner and outer edges of the disk is longer than that in other zones to thereby improve reliability in recording/reproducing characteristics in the specified zones, which have otherwise degraded recording/reproducing characteristics due to inferior physical characteristics of the recording film.

25 Claims, 15 Drawing Sheets

FIG. 5

| ZONE | SECTOR/REV | RADIUS (mm) | MARK LENGTH ($\mu$m) | |
|---|---|---|---|---|
| | | | MIN | MAX |
| 1 | 37 | 27.00 | 0.542 | 0.556 |
| 2 | 38 | 27.72 | 0.542 | 0.556 |
| 3 | 39 | 28.44 | 0.541 | 0.555 |
| 4 | 41 | 29.16 | 0.528 | 0.541 |
| 5 | 42 | 29.88 | 0.528 | 0.541 |
| 6 | 43 | 30.60 | 0.528 | 0.541 |
| 18 | 55 | 39.24 | 0.530 | 0.539 |
| 19 | 56 | 39.96 | 0.530 | 0.539 |
| 20 | 57 | 40.68 | 0.530 | 0.539 |
| 46 | 83 | 59.40 | 0.531 | 0.538 |
| 47 | 84 | 60.12 | 0.531 | 0.538 |
| 48 | 85 | 60.84 | 0.531 | 0.538 |
| 49 | 85 | 61.56 | 0.538 | 0.544 |
| 50 | 84 | 62.28 | 0.550 | 0.557 |

FIG. 6

| ZONE | SECTOR /REV | RADIUS (mm) | MARK LENGTH ($\mu$m) | |
|---|---|---|---|---|
| | | | MIN | MAX |
| 1 | 42 | 30.00 | 0.530 | 0.543 |
| 2 | 43 | 30.71 | 0.530 | 0.543 |
| 3 | 44 | 31.43 | 0.530 | 0.542 |
| 4 | 45 | 32.14 | 0.530 | 0.542 |
| 5 | 46 | 32.86 | 0.530 | 0.542 |
| 6 | 47 | 33.57 | 0.530 | 0.542 |
| 18 | 59 | 42.14 | 0.530 | 0.539 |
| 19 | 60 | 42.86 | 0.530 | 0.539 |
| 20 | 61 | 43.57 | 0.530 | 0.539 |
| 40 | 81 | 57.86 | 0.530 | 0.537 |
| 41 | 82 | 58.57 | 0.530 | 0.537 |
| 42 | 83 | 59.29 | 0.530 | 0.537 |

FIG. 7

| ZONE | SECTOR /REV | RADIUS (mm) | MARK LENGTH ($\mu$m) | |
|---|---|---|---|---|
| | | | MIN | MAX |
| 1 | 38 | 27.00 | 0.527 | 0.542 |
| 2 | 39 | 27.72 | 0.528 | 0.541 |
| 3 | 40 | 28.44 | 0.528 | 0.541 |
| 4 | 41 | 29.16 | 0.528 | 0.541 |
| 5 | 42 | 29.88 | 0.528 | 0.541 |
| 6 | 43 | 30.60 | 0.528 | 0.541 |
| 18 | 55 | 39.24 | 0.530 | 0.539 |
| 19 | 56 | 39.96 | 0.530 | 0.539 |
| 20 | 57 | 40.68 | 0.530 | 0.539 |
| 46 | 83 | 59.40 | 0.531 | 0.538 |
| 47 | 84 | 60.42 | 0.531 | 0.538 |
| 48 | 85 | 60.84 | 0.531 | 0.538 |
| 49 | 86 | 61.56 | 0.531 | 0.538 |
| 50 | 87 | 62.28 | 0.531 | 0.538 |

FIG. 10

| ZONE | SECTOR /REV | RADIUS (mm) | MARK LENGTH (μm) | |
|---|---|---|---|---|
| | | | MIN | MAX |
| 1 | 37 | 27.00 | 0.542 | 0.556 |
| 2 | 38 | 27.72 | 0.542 | 0.556 |
| 3 | 39 | 28.44 | 0.541 | 0.555 |
| 4 | 41 | 29.16 | 0.528 | 0.541 |
| 5 | 42 | 29.88 | 0.528 | 0.541 |
| 6 | 43 | 30.60 | 0.528 | 0.541 |
| 18 | 55 | 39.24 | 0.530 | 0.539 |
| 19 | 56 | 39.96 | 0.530 | 0.539 |
| 20 | 57 | 40.68 | 0.530 | 0.539 |
| 46 | 83 | 59.40 | 0.531 | 0.538 |
| 47 | 84 | 60.12 | 0.531 | 0.538 |
| 48 | 85 | 60.84 | 0.531 | 0.544 |
| 49 | 84 | 62.28 | 0.550 | 0.557 |

FIG. 11

| ZONE | RSTART | RSTOP | SECTOR/REV | REV/ZONE | MARK LENGTH (μm) MIN. | MAX. | CAPACITY/ZONE (MB) |
|---|---|---|---|---|---|---|---|
| 0 | 29.68 | 30.27 | 41 | 697 | 0.535 | 0.546 | 29.263 |
| 1 | 30.27 | 31.00 | 42 | 850 | 0.533 | 0.546 | 36.557 |
| 2 | 31.00 | 31.72 | 43 | 850 | 0.533 | 0.546 | 37.427 |
| 3 | 31.72 | 32.44 | 44 | 850 | 0.533 | 0.545 | 38.298 |
| 4 | 32.44 | 33.17 | 45 | 850 | 0.533 | 0.545 | 39.168 |
| 5 | 33.17 | 33.87 | 46 | 833 | 0.533 | 0.545 | 39.238 |
| 6 | 33.88 | 34.60 | 47 | 850 | 0.533 | 0.544 | 40.909 |
| 7 | 34.60 | 35.32 | 48 | 850 | 0.533 | 0.544 | 41.779 |
| 8 | 35.32 | 36.04 | 49 | 850 | 0.533 | 0.544 | 42.650 |
| 9 | 36.05 | 36.77 | 50 | 850 | 0.533 | 0.544 | 43.520 |
| 10 | 36.77 | 37.48 | 51 | 833 | 0.533 | 0.543 | 43.503 |
| 11 | 37.48 | 38.20 | 52 | 850 | 0.533 | 0.543 | 45.261 |
| 12 | 38.20 | 38.92 | 53 | 850 | 0.533 | 0.543 | 46.131 |
| 13 | 38.92 | 39.65 | 54 | 850 | 0.533 | 0.543 | 47.002 |
| 14 | 39.65 | 40.37 | 55 | 850 | 0.533 | 0.543 | 47.872 |
| 15 | 40.37 | 41.09 | 56 | 850 | 0.533 | 0.543 | 48.742 |
| 16 | 41.09 | 41.80 | 57 | 833 | 0.533 | 0.542 | 48.621 |
| 17 | 41.80 | 42.53 | 58 | 850 | 0.533 | 0.542 | 50.483 |
| 18 | 42.53 | 43.25 | 59 | 850 | 0.533 | 0.542 | 51.354 |
| 19 | 43.25 | 43.97 | 60 | 850 | 0.533 | 0.542 | 52.224 |
| 20 | 43.97 | 44.70 | 61 | 850 | 0.533 | 0.542 | 53.094 |
| 21 | 44.70 | 45.41 | 62 | 833 | 0.533 | 0.542 | 52.886 |
| 22 | 45.41 | 46.13 | 63 | 850 | 0.533 | 0.541 | 54.835 |
| 23 | 46.13 | 46.85 | 64 | 850 | 0.533 | 0.541 | 55.706 |
| 24 | 46.85 | 47.58 | 65 | 850 | 0.533 | 0.541 | 56.576 |
| 25 | 47.58 | 48.30 | 66 | 850 | 0.533 | 0.541 | 57.446 |
| 26 | 48.30 | 49.02 | 67 | 850 | 0.533 | 0.541 | 58.317 |
| 27 | 49.02 | 49.73 | 68 | 833 | 0.533 | 0.541 | 58.003 |
| 28 | 49.73 | 50.45 | 69 | 850 | 0.533 | 0.541 | 60.058 |
| 29 | 50.45 | 51.18 | 70 | 850 | 0.533 | 0.541 | 60.928 |
| 30 | 51.18 | 51.90 | 71 | 850 | 0.533 | 0.541 | 61.798 |
| 31 | 51.90 | 52.62 | 72 | 850 | 0.533 | 0.541 | 62.669 |
| 32 | 52.62 | 53.33 | 73 | 833 | 0.533 | 0.540 | 62.268 |
| 33 | 53.33 | 54.06 | 74 | 850 | 0.533 | 0.540 | 64.410 |
| 34 | 54.06 | 54.78 | 75 | 850 | 0.533 | 0.540 | 65.280 |
| 35 | 54.78 | 55.50 | 76 | 850 | 0.533 | 0.540 | 66.150 |
| 36 | 55.50 | 56.23 | 77 | 850 | 0.533 | 0.540 | 67.021 |
| 37 | 56.23 | 56.95 | 78 | 850 | 0.533 | 0.540 | 67.891 |
| 38 | 56.95 | 57.66 | 79 | 833 | 0.533 | 0.540 | 67.386 |
| 39 | 57.66 | 58.38 | 80 | 850 | 0.533 | 0.540 | 69.632 |
| 40 | 58.38 | 59.11 | 81 | 850 | 0.533 | 0.540 | 70.502 |
| 41 | 59.11 | 59.83 | 82 | 850 | 0.533 | 0.540 | 71.373 |
| 42 | 59.83 | 60.55 | 83 | 850 | 0.533 | 0.540 | 72.243 |
| 43 | 60.55 | 61.26 | 84 | 833 | 0.533 | 0.539 | 71.651 |
| 44 | 61.26 | 61.98 | 85 | 850 | 0.533 | 0.539 | 73.984 |
| 45 | 61.99 | 62.09 | 86 | 119 | 0.533 | 0.534 | 10.480 |
| | | | | | | TOTAL CAPACITY | 2462.588 (MB) |

FIG. 13

| ZONE | RSTART | RSTOP | SECTOR/REV | REV/ZONE | MARK LENGTH (μm) MIN. | MAX. | CAPACITY/ZONE (MB) |
|---|---|---|---|---|---|---|---|
| 0 | 29.68 | 30.27 | 41 | 697 | 0.535 | 0.546 | 29.263 |
| 1 | 30.27 | 31.00 | 42 | 850 | 0.533 | 0.546 | 36.557 |
| 2 | 31.00 | 31.72 | 43 | 850 | 0.533 | 0.546 | 37.427 |
| 3 | 31.72 | 32.44 | 44 | 850 | 0.533 | 0.545 | 38.298 |
| 4 | 32.44 | 33.17 | 45 | 850 | 0.533 | 0.545 | 39.168 |
| 5 | 33.17 | 33.87 | 46 | 833 | 0.533 | 0.545 | 39.238 |
| 6 | 33.88 | 34.60 | 47 | 850 | 0.533 | 0.544 | 40.909 |
| 7 | 34.60 | 35.32 | 48 | 850 | 0.533 | 0.544 | 41.779 |
| 8 | 35.32 | 36.04 | 49 | 850 | 0.533 | 0.544 | 42.650 |
| 9 | 36.05 | 36.77 | 50 | 850 | 0.533 | 0.544 | 43.520 |
| 10 | 36.77 | 37.48 | 51 | 833 | 0.533 | 0.543 | 43.503 |
| 11 | 37.48 | 38.20 | 52 | 850 | 0.533 | 0.543 | 45.261 |
| 12 | 38.20 | 38.92 | 53 | 850 | 0.533 | 0.543 | 46.131 |
| 13 | 38.92 | 39.65 | 54 | 850 | 0.533 | 0.543 | 47.002 |
| 14 | 39.65 | 40.37 | 55 | 850 | 0.533 | 0.543 | 47.872 |
| 15 | 40.37 | 41.09 | 56 | 850 | 0.533 | 0.543 | 48.742 |
| 16 | 41.09 | 41.80 | 57 | 833 | 0.533 | 0.542 | 48.621 |
| 17 | 41.80 | 42.53 | 58 | 850 | 0.533 | 0.542 | 50.483 |
| 18 | 42.53 | 43.25 | 59 | 850 | 0.533 | 0.542 | 51.354 |
| 19 | 43.25 | 43.97 | 60 | 850 | 0.533 | 0.542 | 52.224 |
| 20 | 43.97 | 44.70 | 61 | 850 | 0.533 | 0.542 | 53.094 |
| 21 | 44.70 | 45.41 | 62 | 833 | 0.533 | 0.542 | 52.886 |
| 22 | 45.41 | 46.13 | 63 | 850 | 0.533 | 0.541 | 54.835 |
| 23 | 46.13 | 46.85 | 64 | 850 | 0.533 | 0.541 | 55.706 |
| 24 | 46.85 | 47.58 | 65 | 850 | 0.533 | 0.541 | 56.576 |
| 25 | 47.58 | 48.30 | 66 | 850 | 0.533 | 0.541 | 57.446 |
| 26 | 48.30 | 49.02 | 67 | 850 | 0.533 | 0.541 | 58.317 |
| 27 | 49.02 | 49.73 | 68 | 833 | 0.533 | 0.541 | 58.003 |
| 28 | 49.73 | 50.45 | 69 | 850 | 0.533 | 0.541 | 60.058 |
| 29 | 50.45 | 51.18 | 70 | 850 | 0.533 | 0.541 | 60.928 |
| 30 | 51.18 | 51.90 | 71 | 850 | 0.533 | 0.541 | 61.798 |
| 31 | 51.90 | 52.62 | 72 | 850 | 0.533 | 0.541 | 62.669 |
| 32 | 52.62 | 53.33 | 73 | 833 | 0.533 | 0.540 | 62.268 |
| 33 | 53.33 | 54.06 | 74 | 850 | 0.533 | 0.540 | 64.410 |
| 34 | 54.06 | 54.78 | 75 | 850 | 0.533 | 0.540 | 65.280 |
| 35 | 54.78 | 55.50 | 76 | 850 | 0.533 | 0.540 | 66.150 |
| 36 | 55.50 | 56.23 | 77 | 850 | 0.533 | 0.540 | 67.021 |
| 37 | 56.23 | 56.95 | 78 | 850 | 0.533 | 0.540 | 67.891 |
| 38 | 56.95 | 57.66 | 79 | 833 | 0.533 | 0.540 | 67.386 |
| 39 | 57.66 | 58.38 | 80 | 850 | 0.533 | 0.540 | 69.632 |
| 40 | 58.38 | 59.11 | 81 | 850 | 0.533 | 0.540 | 70.502 |
| 41 | 59.11 | 59.83 | 82 | 850 | 0.533 | 0.540 | 71.373 |
| 42 | 59.83 | 60.55 | 83 | 850 | 0.533 | 0.540 | 72.243 |
| 43 | 60.55 | 61.26 | 84 | 833 | 0.533 | 0.539 | 71.651 |
| 44 | 61.26 | 61.98 | 85 | 850 | 0.533 | 0.539 | 73.984 |
| 45 | 61.99 | 62.09 | 85 | 119 | 0.539 | 0.540 | 10.358 |
| | | | | | TOTAL CAPACITY | | 2462.466 (MB) |

FIG. 14

| ZONE | RSTART | RSTOP | SECTOR /REV | REV /ZONE | MARK LENGTH (μm) MIN. | MAX. | CAPACITY /ZONE (MB) |
|---|---|---|---|---|---|---|---|
| 0 | 29.68 | 30.27 | 41 | 697 | 0.535 | 0.546 | 29.263 |
| 1 | 30.27 | 31.00 | 42 | 850 | 0.533 | 0.546 | 36.557 |
| 2 | 31.00 | 31.72 | 43 | 850 | 0.533 | 0.546 | 37.427 |
| 3 | 31.72 | 32.44 | 44 | 850 | 0.533 | 0.545 | 38.298 |
| 4 | 32.44 | 33.17 | 45 | 850 | 0.533 | 0.545 | 39.168 |
| 5 | 33.17 | 33.87 | 46 | 833 | 0.533 | 0.545 | 39.238 |
| 6 | 33.88 | 34.60 | 47 | 850 | 0.533 | 0.544 | 40.909 |
| 7 | 34.60 | 35.32 | 48 | 850 | 0.533 | 0.544 | 41.779 |
| 8 | 35.32 | 36.04 | 49 | 850 | 0.533 | 0.544 | 42.650 |
| 9 | 36.05 | 36.77 | 50 | 850 | 0.533 | 0.544 | 43.520 |
| 10 | 36.77 | 37.48 | 51 | 833 | 0.533 | 0.543 | 43.503 |
| 11 | 37.48 | 38.20 | 52 | 850 | 0.533 | 0.543 | 45.261 |
| 12 | 38.20 | 38.92 | 53 | 850 | 0.533 | 0.543 | 46.131 |
| 13 | 38.92 | 39.65 | 54 | 850 | 0.533 | 0.543 | 47.002 |
| 14 | 39.65 | 40.37 | 55 | 850 | 0.533 | 0.543 | 47.872 |
| 15 | 40.37 | 41.09 | 56 | 850 | 0.533 | 0.543 | 48.742 |
| 16 | 41.09 | 41.80 | 57 | 833 | 0.533 | 0.542 | 48.621 |
| 17 | 41.80 | 42.53 | 58 | 850 | 0.533 | 0.542 | 50.483 |
| 18 | 42.53 | 43.25 | 59 | 850 | 0.533 | 0.542 | 51.354 |
| 19 | 43.25 | 43.97 | 60 | 850 | 0.533 | 0.542 | 52.224 |
| 20 | 43.97 | 44.70 | 61 | 850 | 0.533 | 0.542 | 53.094 |
| 21 | 44.70 | 45.41 | 62 | 833 | 0.533 | 0.542 | 52.886 |
| 22 | 45.41 | 46.13 | 63 | 850 | 0.533 | 0.541 | 54.835 |
| 23 | 46.13 | 46.85 | 64 | 850 | 0.533 | 0.541 | 55.706 |
| 24 | 46.85 | 47.58 | 65 | 850 | 0.533 | 0.541 | 56.576 |
| 25 | 47.58 | 48.30 | 66 | 850 | 0.533 | 0.541 | 57.446 |
| 26 | 48.30 | 49.02 | 67 | 850 | 0.533 | 0.541 | 58.317 |
| 27 | 49.02 | 49.73 | 68 | 833 | 0.533 | 0.541 | 58.003 |
| 28 | 49.73 | 50.45 | 69 | 850 | 0.533 | 0.541 | 60.058 |
| 29 | 50.45 | 51.18 | 70 | 850 | 0.533 | 0.541 | 60.928 |
| 30 | 51.18 | 51.90 | 71 | 850 | 0.533 | 0.541 | 61.798 |
| 31 | 51.90 | 52.62 | 72 | 850 | 0.533 | 0.541 | 62.669 |
| 32 | 52.62 | 53.33 | 73 | 833 | 0.533 | 0.540 | 62.268 |
| 33 | 53.33 | 54.06 | 74 | 850 | 0.533 | 0.540 | 64.410 |
| 34 | 54.06 | 54.78 | 75 | 850 | 0.533 | 0.540 | 65.280 |
| 35 | 54.78 | 55.50 | 76 | 850 | 0.533 | 0.540 | 66.150 |
| 36 | 55.50 | 56.23 | 77 | 850 | 0.533 | 0.540 | 67.021 |
| 37 | 56.23 | 56.95 | 78 | 850 | 0.533 | 0.540 | 67.891 |
| 38 | 56.95 | 57.66 | 79 | 833 | 0.533 | 0.540 | 67.386 |
| 39 | 57.66 | 58.38 | 80 | 850 | 0.533 | 0.540 | 69.632 |
| 40 | 58.38 | 59.11 | 81 | 850 | 0.533 | 0.540 | 70.502 |
| 41 | 59.11 | 59.83 | 82 | 850 | 0.533 | 0.540 | 71.373 |
| 42 | 59.83 | 60.55 | 83 | 850 | 0.533 | 0.540 | 72.243 |
| 43 | 60.55 | 61.26 | 84 | 833 | 0.533 | 0.539 | 71.651 |
| 44 | 61.26 | 61.98 | 84 | 850 | 0.539 | 0.546 | 73.114 |
| 45 | 61.99 | 62.09 | 85 | 119 | 0.539 | 0.540 | 10.358 |
| | | | | | | TOTAL CAPACITY | 2461.596 (MB) |

FIG. 15

| ZONE | RSTART | RSTOP | SECTOR /REV | REV /ZONE | MARK LENGTH (μm) MIN. | MAX. | CAPACITY /ZONE (MB) |
|---|---|---|---|---|---|---|---|
| 0 | 29.68 | 30.27 | 41 | 697 | 0.535 | 0.546 | 29.263 |
| 1 | 30.27 | 31.00 | 42 | 850 | 0.533 | 0.546 | 36.557 |
| 2 | 31.00 | 31.72 | 43 | 850 | 0.533 | 0.546 | 37.427 |
| 3 | 31.72 | 32.44 | 44 | 850 | 0.533 | 0.545 | 38.298 |
| 4 | 32.44 | 33.17 | 45 | 850 | 0.533 | 0.545 | 39.168 |
| 5 | 33.17 | 33.87 | 46 | 833 | 0.533 | 0.545 | 39.238 |
| 6 | 33.88 | 34.60 | 47 | 850 | 0.533 | 0.544 | 40.909 |
| 7 | 34.60 | 35.32 | 48 | 850 | 0.533 | 0.544 | 41.779 |
| 8 | 35.32 | 36.04 | 49 | 850 | 0.533 | 0.544 | 42.650 |
| 9 | 36.05 | 36.77 | 50 | 850 | 0.533 | 0.544 | 43.520 |
| 10 | 36.77 | 37.48 | 51 | 833 | 0.533 | 0.543 | 43.503 |
| 11 | 37.48 | 38.20 | 52 | 850 | 0.533 | 0.543 | 45.261 |
| 12 | 38.20 | 38.92 | 53 | 850 | 0.533 | 0.543 | 46.131 |
| 13 | 38.92 | 39.65 | 54 | 850 | 0.533 | 0.543 | 47.002 |
| 14 | 39.65 | 40.37 | 55 | 850 | 0.533 | 0.543 | 47.872 |
| 15 | 40.37 | 41.09 | 56 | 850 | 0.533 | 0.543 | 48.742 |
| 16 | 41.09 | 41.80 | 57 | 833 | 0.533 | 0.542 | 48.621 |
| 17 | 41.80 | 42.53 | 58 | 850 | 0.533 | 0.542 | 50.483 |
| 18 | 42.53 | 43.25 | 59 | 850 | 0.533 | 0.542 | 51.354 |
| 19 | 43.25 | 43.97 | 60 | 850 | 0.533 | 0.542 | 52.224 |
| 20 | 43.97 | 44.70 | 61 | 850 | 0.533 | 0.542 | 53.094 |
| 21 | 44.70 | 45.41 | 62 | 833 | 0.533 | 0.542 | 52.886 |
| 22 | 45.41 | 46.13 | 63 | 850 | 0.533 | 0.541 | 54.835 |
| 23 | 46.13 | 46.85 | 64 | 850 | 0.533 | 0.541 | 55.706 |
| 24 | 46.85 | 47.58 | 65 | 850 | 0.533 | 0.541 | 56.576 |
| 25 | 47.58 | 48.30 | 66 | 850 | 0.533 | 0.541 | 57.446 |
| 26 | 48.30 | 49.02 | 67 | 850 | 0.533 | 0.541 | 58.317 |
| 27 | 49.02 | 49.73 | 68 | 833 | 0.533 | 0.541 | 58.003 |
| 28 | 49.73 | 50.45 | 69 | 850 | 0.533 | 0.541 | 60.058 |
| 29 | 50.45 | 51.18 | 70 | 850 | 0.533 | 0.541 | 60.928 |
| 30 | 51.18 | 51.90 | 71 | 850 | 0.533 | 0.541 | 61.798 |
| 31 | 51.90 | 52.62 | 72 | 850 | 0.533 | 0.541 | 62.669 |
| 32 | 52.62 | 53.33 | 73 | 833 | 0.533 | 0.540 | 62.268 |
| 33 | 53.33 | 54.06 | 74 | 850 | 0.533 | 0.540 | 64.410 |
| 34 | 54.06 | 54.78 | 75 | 850 | 0.533 | 0.540 | 65.280 |
| 35 | 54.78 | 55.50 | 76 | 850 | 0.533 | 0.540 | 66.150 |
| 36 | 55.50 | 56.23 | 77 | 850 | 0.533 | 0.540 | 67.021 |
| 37 | 56.23 | 56.95 | 78 | 850 | 0.533 | 0.540 | 67.891 |
| 38 | 56.95 | 57.66 | 79 | 833 | 0.533 | 0.540 | 67.386 |
| 39 | 57.66 | 58.38 | 80 | 850 | 0.533 | 0.540 | 69.632 |
| 40 | 58.38 | 59.11 | 81 | 850 | 0.533 | 0.540 | 70.502 |
| 41 | 59.11 | 59.83 | 82 | 850 | 0.533 | 0.540 | 71.373 |
| 42 | 59.83 | 60.55 | 83 | 850 | 0.533 | 0.540 | 72.243 |
| 43 | 60.55 | 61.26 | 84 | 833 | 0.533 | 0.539 | 71.651 |
| 44 | 61.26 | 61.98 | 84 | 850 | 0.539 | 0.546 | 73.114 |
| 45 | 61.99 | 62.09 | 84 | 119 | 0.546 | 0.547 | 10.236 |
| | | | | | TOTAL CAPACITY | | 2461.474 (MB) |

FIG. 16

| ZONE | RSTART | RSTOP | SECTOR /REV | REV /ZONE | MARK LENGTH (μm) MIN. | MAX. | CAPACITY /ZONE (MB) |
|---|---|---|---|---|---|---|---|
| 0 | 29.68 | 30.27 | 41 | 697 | 0.535 | 0.546 | 29.263 |
| 1 | 30.27 | 31.00 | 42 | 850 | 0.533 | 0.546 | 36.557 |
| 2 | 31.00 | 31.72 | 43 | 850 | 0.533 | 0.546 | 37.427 |
| 3 | 31.72 | 32.44 | 44 | 850 | 0.533 | 0.545 | 38.298 |
| 4 | 32.44 | 33.17 | 45 | 850 | 0.533 | 0.545 | 39.168 |
| 5 | 33.17 | 33.87 | 46 | 833 | 0.533 | 0.545 | 39.238 |
| 6 | 33.88 | 34.60 | 47 | 850 | 0.533 | 0.544 | 40.909 |
| 7 | 34.60 | 35.32 | 48 | 850 | 0.533 | 0.544 | 41.779 |
| 8 | 35.32 | 36.04 | 49 | 850 | 0.533 | 0.544 | 42.650 |
| 9 | 36.05 | 36.77 | 50 | 850 | 0.533 | 0.544 | 43.520 |
| 10 | 36.77 | 37.48 | 51 | 833 | 0.533 | 0.543 | 43.503 |
| 11 | 37.48 | 38.20 | 52 | 850 | 0.533 | 0.543 | 45.261 |
| 12 | 38.20 | 38.92 | 53 | 850 | 0.533 | 0.543 | 46.131 |
| 13 | 38.92 | 39.65 | 54 | 850 | 0.533 | 0.543 | 47.002 |
| 14 | 39.65 | 40.37 | 55 | 850 | 0.533 | 0.543 | 47.872 |
| 15 | 40.37 | 41.09 | 56 | 850 | 0.533 | 0.543 | 48.742 |
| 16 | 41.09 | 41.80 | 57 | 833 | 0.533 | 0.542 | 48.621 |
| 17 | 41.80 | 42.53 | 58 | 850 | 0.533 | 0.542 | 50.483 |
| 18 | 42.53 | 43.25 | 59 | 850 | 0.533 | 0.542 | 51.354 |
| 19 | 43.25 | 43.97 | 60 | 850 | 0.533 | 0.542 | 52.224 |
| 20 | 43.97 | 44.70 | 61 | 850 | 0.533 | 0.542 | 53.094 |
| 21 | 44.70 | 45.41 | 62 | 833 | 0.533 | 0.542 | 52.886 |
| 22 | 45.41 | 46.13 | 63 | 850 | 0.533 | 0.541 | 54.835 |
| 23 | 46.13 | 46.85 | 64 | 850 | 0.533 | 0.541 | 55.706 |
| 24 | 46.85 | 47.58 | 65 | 850 | 0.533 | 0.541 | 56.576 |
| 25 | 47.58 | 48.30 | 66 | 850 | 0.533 | 0.541 | 57.446 |
| 26 | 48.30 | 49.02 | 67 | 850 | 0.533 | 0.541 | 58.317 |
| 27 | 49.02 | 49.73 | 68 | 833 | 0.533 | 0.541 | 58.003 |
| 28 | 49.73 | 50.45 | 69 | 850 | 0.533 | 0.541 | 60.058 |
| 29 | 50.45 | 51.18 | 70 | 850 | 0.533 | 0.541 | 60.928 |
| 30 | 51.18 | 51.90 | 71 | 850 | 0.533 | 0.541 | 61.798 |
| 31 | 51.90 | 52.62 | 72 | 850 | 0.533 | 0.541 | 62.669 |
| 32 | 52.62 | 53.33 | 73 | 833 | 0.533 | 0.540 | 62.268 |
| 33 | 53.33 | 54.06 | 74 | 850 | 0.533 | 0.540 | 64.410 |
| 34 | 54.06 | 54.78 | 75 | 850 | 0.533 | 0.540 | 65.280 |
| 35 | 54.78 | 55.50 | 76 | 850 | 0.533 | 0.540 | 66.150 |
| 36 | 55.50 | 56.23 | 77 | 850 | 0.533 | 0.540 | 67.021 |
| 37 | 56.23 | 56.95 | 78 | 850 | 0.533 | 0.540 | 67.891 |
| 38 | 56.95 | 57.66 | 79 | 833 | 0.533 | 0.540 | 67.386 |
| 39 | 57.66 | 58.38 | 80 | 850 | 0.533 | 0.540 | 69.632 |
| 40 | 58.38 | 59.11 | 81 | 850 | 0.533 | 0.540 | 70.502 |
| 41 | 59.11 | 59.83 | 82 | 850 | 0.533 | 0.540 | 71.373 |
| 42 | 59.83 | 60.55 | 83 | 850 | 0.533 | 0.540 | 72.243 |
| 43 | 60.55 | 61.95 | 84 | 1649 | 0.533 | 0.545 | 141.840 |
| 44 | 61.96 | 62.10 | 85 | 170 | 0.539 | 0.540 | 14.797 |
| | | | | | | TOTAL CAPACITY | 2463.110 (MB) |

FIG. 17

| ZONE | RSTART | RSTOP | SECTOR /REV | REV /ZONE | MARK LENGTH (μm) MIN. | MARK LENGTH (μm) MAX. | CAPACITY /ZONE (MB) |
|---|---|---|---|---|---|---|---|
| 0 | 30.14 | 30.85 | 41 | 833 | 0.544 | 0.556 | 34.973 |
| 1 | 30.85 | 31.56 | 42 | 833 | 0.543 | 0.556 | 35.826 |
| 2 | 31.56 | 32.26 | 43 | 833 | 0.543 | 0.555 | 36.679 |
| 3 | 32.26 | 32.97 | 44 | 833 | 0.542 | 0.554 | 37.532 |
| 4 | 32.97 | 33.68 | 45 | 833 | 0.542 | 0.554 | 38.385 |
| 5 | 33.68 | 34.39 | 46 | 833 | 0.541 | 0.553 | 39.238 |
| 6 | 34.39 | 35.10 | 47 | 833 | 0.541 | 0.552 | 40.091 |
| 7 | 35.10 | 35.80 | 48 | 833 | 0.541 | 0.552 | 40.944 |
| 8 | 35.80 | 36.51 | 49 | 833 | 0.540 | 0.551 | 41.797 |
| 9 | 36.51 | 37.22 | 50 | 833 | 0.540 | 0.551 | 42.650 |
| 10 | 37.22 | 37.93 | 51 | 833 | 0.540 | 0.550 | 43.503 |
| 11 | 37.93 | 38.64 | 52 | 833 | 0.539 | 0.549 | 44.356 |
| 12 | 38.64 | 39.34 | 53 | 833 | 0.539 | 0.549 | 45.209 |
| 13 | 39.34 | 40.05 | 54 | 833 | 0.539 | 0.549 | 46.062 |
| 14 | 40.05 | 40.76 | 55 | 833 | 0.539 | 0.548 | 46.915 |
| 15 | 40.76 | 41.47 | 56 | 833 | 0.538 | 0.548 | 47.768 |
| 16 | 41.47 | 42.18 | 57 | 833 | 0.538 | 0.547 | 48.621 |
| 17 | 42.18 | 42.88 | 58 | 833 | 0.538 | 0.547 | 49.474 |
| 18 | 42.88 | 43.59 | 59 | 833 | 0.538 | 0.546 | 50.327 |
| 19 | 43.59 | 44.30 | 60 | 833 | 0.537 | 0.546 | 51.180 |
| 20 | 44.30 | 45.01 | 61 | 833 | 0.537 | 0.546 | 52.033 |
| 21 | 45.01 | 45.72 | 62 | 833 | 0.537 | 0.545 | 52.886 |
| 22 | 45.72 | 46.43 | 63 | 833 | 0.537 | 0.545 | 53.738 |
| 23 | 46.43 | 47.13 | 64 | 833 | 0.536 | 0.545 | 54.591 |
| 24 | 47.13 | 47.84 | 65 | 833 | 0.536 | 0.544 | 55.444 |
| 25 | 47.84 | 48.55 | 66 | 833 | 0.536 | 0.544 | 56.297 |
| 26 | 48.55 | 49.26 | 67 | 833 | 0.536 | 0.544 | 57.150 |
| 27 | 49.26 | 49.97 | 68 | 833 | 0.536 | 0.543 | 58.003 |
| 28 | 49.97 | 50.67 | 69 | 833 | 0.536 | 0.543 | 58.856 |
| 29 | 50.67 | 51.38 | 70 | 833 | 0.535 | 0.543 | 59.709 |
| 30 | 51.38 | 52.09 | 71 | 833 | 0.535 | 0.543 | 60.562 |
| 31 | 52.09 | 52.80 | 72 | 833 | 0.535 | 0.542 | 61.415 |
| 32 | 52.80 | 53.51 | 73 | 833 | 0.535 | 0.542 | 62.268 |
| 33 | 53.51 | 54.21 | 74 | 833 | 0.535 | 0.542 | 63.121 |
| 34 | 54.21 | 54.92 | 75 | 833 | 0.535 | 0.542 | 63.974 |
| 35 | 54.92 | 55.63 | 76 | 833 | 0.534 | 0.541 | 64.827 |
| 36 | 55.63 | 56.34 | 77 | 833 | 0.534 | 0.541 | 65.680 |
| 37 | 56.34 | 57.05 | 78 | 833 | 0.534 | 0.541 | 66.533 |
| 38 | 57.05 | 57.75 | 79 | 833 | 0.534 | 0.541 | 67.386 |
| 39 | 57.75 | 58.46 | 80 | 833 | 0.534 | 0.540 | 68.239 |
| 40 | 58.46 | 59.17 | 81 | 833 | 0.534 | 0.540 | 69.092 |
| 41 | 59.17 | 59.88 | 82 | 833 | 0.534 | 0.540 | 69.945 |
| 42 | 59.88 | 60.59 | 83 | 833 | 0.534 | 0.540 | 70.798 |
| 43 | 60.59 | 61.29 | 84 | 833 | 0.533 | 0.540 | 71.651 |
| 44 | 61.29 | 62.00 | 85 | 833 | 0.533 | 0.539 | 72.504 |
| | | | | | | TOTAL CAPACITY | 2418.232 (MB) | ns
OPTICAL DISK HAVING A LARGE STORAGE CAPACITY

BACKGROUND OF THE INVENTION (a) Field of the Invention

The present invention relates to an optical disk having a large storage capacity and, more particularly, to an improvement of the disk format to increase the recording capacity of the optical disk.

(b) Description of the Related Art

An optical disk including a magneto-optical disk is generally defined as a recording disk to and from which digital data is recorded and reproduced by using an optical technology. A magneto-optical disk, for instance, is manufactured by sputtering an magneto-optical recording film on a substrate, which is fabricated by molding from an original disk called stamper and has a single spiral groove or a plurality of concentric grooves thereon. The magneto-optical disk stores thereon data recorded as magnetic marks on a magneto-optical film, which marks are reproduced by irradiating a laser beam onto the magneto-optical film. In general, the user's data area of the magneto-optical disk is divided into a plurality of zones or bands based on the radial position of the disk. Each of the zones is also divided into a plurality of sectors in the direction of the tracks, each sector defining a fixed central angle.

In a conventional magneto-optical disk, a disk format called CAV (Constant Angular Velocity) has been generally employed wherein the number of sectors disposed in one physical track (or in one revolution) is fixed throughout the disk, i.e., one physical track is divided into a fixed number of sectors in any zone of the disk. In this format, the magneto-optical disk is rotated at a constant angular velocity at any radial position to provide a linear velocity which is proportional to the radius of the position in the disk. In the CAV disk format, however, the storage capacity is not satisfactory, because the recording density in the disk is lower at the radially outer zones.

For increase of the storage capacity, a modified CAV (MCAV) format is employed recently, wherein the number of the sectors in one physical track is increased as viewed toward the outer periphery of the disk, which is obtained by maintaining the linear recording density of the disk substantially at a constant between the zones irrespective of the radial position of the zone in the disk.

The increase of the storage capacity in the optical disk, which is ever requested to the magneto-optical disk in accordance with the increase in the amount of data, is also attempted by improving the physical characteristics of the magnetic recording film and the performance of the disk drive.

There is a limitation, however, in the increase of the storage capacity merely by improving the physical characteristics of the magnetic recording film or performance of the disk drive. It is convenient, therefore, that the storage capacity can be increased by improving the recording format for the optical disk. Even if the increase in the storage capacity achieved thereby remains only a few percents, the increase is in fact considered to be significant because the prospect increase by improving the hardware for the optical disk is also on that order.

In the above discussion, the magneto-optical disk is exemplified. However, the above discussion applies to any optical disk, so long as the optical disk has a recording layer on a disk substrate for storing data on a plurality of concentric tracks or a spiral track.

SUMMARY OF THE INVENTION

In view of the above, it is an object of the present invention to provide an optical disk which is capable of storing a larger amount of data by improving the recording format of the optical disk.

The present invention provides in a first aspect thereof an optical disk comprising a substrate and a recording layer formed on the substrate, the recording layer defining a data area divided into a plurality of ring-shaped zones, the zones including an innermost first zone (or zone 1) through an outermost Mth zone (or zone M) arranged concentrically with each other, each of the zones including a plurality of physical tracks each divided into a plurality of sectors in the direction along the physical track, the improvement wherein a number $N(k+1)$ of sectors per physical track in $(k+1)$th zone is expressed in terms of number $N(k)$ of sectors per physical track in kth zone by the following relation:

for $k=1$ to $k=k_1-1$, $N(k+1)=N(k)+L$; and for $k=k_1$ to $k=M-1$, $N(k+1) \leq N(k)+L$ provided that $N(k+1) < N(k)+L$ holds for at least one of k's between $K_1$ and $M-1$, wherein L is a fixed integer and $K_1$th zone resides in the vicinity of the Mth zone.

In a preferred embodiment of the present invention, the optical disk comprises a substrate and a recording layer formed on the substrate, the recording layer defining a data area divided into a plurality of ring-shaped zones, the zones including an innermost first zone through an outermost Mth zone arranged concentrically with each other, each of the zones including a plurality of physical tracks each divided into a plurality of sectors in the direction along the physical track, the improvement wherein a number $N(k+1)$ of sectors per physical track in $(k+1)$th zone is expressed in terms of number $N(k)$ of sectors per physical track in kth zone by the following relation:

for $k=1$ to $k=k_2$, $N(k+1) \leq N(k)+L$ provided that $N(k+1) > N(k)+L$ holds for at least one of k's between 1 and $k_2$, for $k=k_2+1$ to $k=k_1-1$, $N(k+1)=N(k)+L$, and for $k=k_1$ to $k=M-1$, $N(k+1) \leq N(k)+L$ provided that $N(k+1) < N(k)+L$ holds for at least one of k's between $K_1$ and $M-1$, wherein L is a fixed integer, $k_2$th zone and $K_1$th zone reside in the vicinity of the first zone and Mth zone, respectively.

In accordance with the first aspect of the present invention, the storage capacity of the optical disk can be increased by enlarging the recording area to the outer and inner edges of the optical disk where the recording characteristics are inferior compared to other portion, and yet reliability of recording/reproducing characteristics can be secured by reducing the recording density in the outer or inner zone, disposed in the vicinity of the inner or outer edge of the disk.

In the optical disk according to the present invention, it is preferable that the $k_1$ zone be located within 4 mm from the outer edge of the disk (i.e., between the outer edge and a radial position 4 mm apart from the outer edge, the same applies hereafter), and located within 2 mm from the outer edge of the recording film. In this case, an excellent recording characteristic can be obtained in each zone and a large storage capacity of the optical disk can be also obtained. It is also preferable that the $k_2$ zone be located within 15 mm from the inner edge of the disk substrate and located within 22 mm from the edge of the aperture or sprocket hole of the disk substrate. Furthermore, it is also preferable to select $k_1$ and $k_2$ such that $k_1=M-1$ and $k_2=1$.

In a conventional magneto-optical disk, it is known that recording characteristics are inferior in the outer and inner edge portions of the disk compared to the other portion of the disk, which fact results from oxidation of the recording film in the edge portions, large birefringence in the inner and outer edge portions produced during the fabrication process for the disk substrate, large birefringence in the inner edge portion due to the stress produced during attachment of hub to the disk substrate, focus offset or track offset of the optical spot for recording and reproducing in the outer edge portion of the disk substrate due to the tilt, axial or radial acceleration during the rotation of the disk, and so on.

FIGS. 1 and 2 show the relationship between the radial position and the axial acceleration of the recording surface (acceleration in the direction perpendicular to the disk surface) at the radial position and the relationship between the radial position and the radial acceleration of the track (acceleration in the direction parallel to the recording surface) at the radial position, respectively, in a rotating magneto-optical disk. As shown in these figures, the outer portion of the disk outside the radial position at 60 mm is subjected to an increased acceleration in the directions perpendicular and parallel to the disk surface. The increased acceleration in the axial and radial directions generates deviation of the focus of the optical spot relative to the disk surface and deviation of the track, thereby degrading the recording/reproducing characteristics of the magneto-optical disk.

FIG. 3 shows an example of the relationship between the radial position and C/N (carrier to noise ratio, or CN ratio) characteristic at the radial position in a magneto-optical disk, wherein a mark having a mark length of 0.64 $\mu$m is recorded on the magneto-optical disk, which includes a substrate having an inner edge at 12.5 mm radial position, an outer edge at 65 mm radial position and a track pitch of 1.0 $\mu$m. Due to the several factors as mentioned above, the magneto-optical disk has poor recording/reproducing characteristics at the inner and outer disk edge portions, wherein the C/N characteristic is considerably degraded at the inner edge portion within the radial position at 30 mm and at the outer edge portion outside the radial position at 60 mm.

In view of the above, it was the general practice in the conventional magneto-optical disk that the magneto-optical recording film is not formed at the inner and outer edge portions of the disk substrate within 1 to 2 mm from both the edges, and that data area is not provided at the inner and outer edge portions of the magneto-optical recording film within 1 to 2 mm from both the edges.

According to the preferred embodiment of the first aspect of the present invention, an additional data area can be provided at the outermost Mth zone as well as innermost 1st zone which are located within, for example, 1 to 2 mm from the outer and inner edges of the optical disk, respectively, and yet reliable recording/reproducing characteristics can be achieved in these zones similarly to the other zones.

The additional data area may include a defect management area or a file allocation table area, whereby a critical accident will not occur in which the data stored in the entire data area cannot be accessed due to the failure in read-out of the defective sector allocation data or the file allocation data etc.

The present invention further provides in a second aspect thereof an optical disk in an optical disk drive, comprising a substrate and a recording layer formed on said substrate, said recording layer defining a data area divided into a plurality of ring-shaped zones, said zones including an innermost first zone through an outermost Mth zone arranged concentrically with each other, each of said zones including a plurality of physical tracks each divided into a plurality of sectors in the direction along the physical track, the improvement wherein:

each zone except for at least one specified zone disposed in the vicinity of at least one of inner and outer edges of said data area has sectors per one physical track in number equal to a sum of a fixed integer and a number of sectors per one physical track in an adjacent inner zone adjacent to said each zone; and a shortest mark length for a unit mark in said each zone is substantially equal to a minimum mark length, and a mark length for the unit mark in each track in said each zone is proportional to a radius of said each track.

In accordance with the second aspect of the present invention, the disk format, in which the shortest mark length in each zone is set at the minimum mark length or at a value slightly larger than the minimum mark length, provides a larger storage capacity of the disk and yet reliable recording/reproducing characteristics in the entire disk area. Specifically, inner and outer edge portions of the disk can be used in the first aspect of the present invention as data storage zones even though they are very small portions, although the inner and outer edge portions were not used because they were fractional in the conventional optical disk in which the number of physical tracks in each zone is set at a constant in the whole disk area. Especially, the outer edge portion of the disk can be used as a large data storage area to significantly increase the storage capacity because the longer physical tracks compared to the other portion of the disk provide a larger number of sectors in each track.

In the optical disk according to the second aspect of the present invention, the number of zones in the disk is selected at any number. The at least one specified zone may includes at least one inner zone and/or at least one outer zone. The at least one outer zone can be arbitrarily specified so long as the outermost zone is included in the at least one outer zone. For instance, only the outermost zone in the data storage area may be specified as the at least one outer zone, or else, a few outer zones adjacent to the outermost zone in addition to the outermost zone may be specified as the at least one outer zone. Similarly, only the innermost zone in the data storage area may be specified as the at least one inner zone, or else, in addition to the innermost zone, a few inner zones adjacent to the innermost zone may be specified as the at least one inner zone. The angular velocity of the disk should be maintained at a constant within each zone, and accordingly, the linear velocity along each track should be proportional to the radius of the track in each zone. The increase in the number of sectors in one zone along the radially outward direction may be any number so long as the number is a positive integer. The positive integer may be and usually is selected at 1.

If the recording/reproducing characteristics are to be evaluated in terms of CN ratio (dB) in an optical disk, the recording/reproducing characteristics will degrade with the decrease in the mark length. In the present invention, a boundary mark length which is defined as the boundary of the mark length providing satisfactory or unsatisfactory characteristics to a disk drive in recording/reproducing operation thereof is selected at a value, for example, equal to or more than 0.40 times the dimension of the reproducing optical spot along the track for providing 42 dB in CN ratio, for example. The boundary mark length may be, more preferably, equal to or more than 0.44 times the dimension of the reproducing optical spot for providing 45 dB in CN ratio. In order to obtain a maximum increase in the storage capacity of the optical disk, a minimum mark length should be preferably selected equal to or below 1.25 times, and more preferably equal to or below 1.1 times, the boundary mark length. It means that the minimum mark length is preferably equal to or below 0.55 times, and more preferably equal to or below 0.50 times, the dimension of the reproducing optical spot along the track.

The second aspect of the present invention is also directed to any optical disk, and is preferably directed to a magneto-optical disk, having a data storage area including a plurality of substantially concentric data tracks formed on a recording film, wherein a plurality of recording marks are arrayed in a mark edge recording format or a partial response recording format. The recording mark in a mark edge recording format has a shape of ellipse, wherein the edge of the recording mark corresponds to data "1" and each data is stored in the distance between the edges. The partial response recording format is another format developed from the mark edge recording format.

A unit mark is generally defined as a mark corresponding to a possible smallest pulse width among marks to be recorded in a track. The shortest mark length in each zone as used in the text is referred to as a mark length for a unit mark recorded in the innermost track in each zone and is accordingly smallest among the mark lengths for the unit mark recorded in all of the tracks in the each zone. Further, the longest mark length in each zone is referred to as a mark length for a unit mark recorded in the outermost track and is longest among the mark lengths for the unit mark recorded in all of the tracks in the each zone.

In each zone, the mark length for the unit mark recorded in a specific track is represented by:
(shortest mark length)×(radius of the specific tack)/(radius of the innermost track) and by:
(longest mark length)×(radius of the specific track)/(radius of the outermost track).

In the second aspect of the present invention, all of the zones other than at least one specified zone may have a common shortest mark length throughout the zones or may have respective different shortest mark lengths. Or otherwise, some of the other zones may have a common shortest mark length and others of the other zones may have respective shortest mark lengths.

The at least one inner zone, for exapmle, in the at least one specified zone may includes only the innermost zone, wherein the shortest mark length in the innermost zone may be longer than the shortest mark length in the adjacent inner zone. Preferably, the shortest mark lengths in the zones other than both the at least one inner zone and at least one outer zone are selected to be 1 to 1.005 times the minimum mark length, or more preferably larger than 1.005 times and most preferably larger than 1.01 times, the minimum mark length.

The optical disk according to the second aspect of the present invention may be implemented by a magneto-optical disk which is currently in market and implemented as an annular disk. Details of the magneto-optical disk design may be as follows: outer diameter 130 mm, inner diameter 15 mm, outer diameter of recording film 126 mm, inner diameter of recording film 43 mm. The at least one outer zone may include a plurality of outer zones located between the outer edge of the substrate and a radial position approximately 4 mm apart from the outer edge of the substrate, or between the outer edge of the recording film and a radial position approximately 2 mm apart from the outer edge of the recording film. The at least one inner zone may include a plurality of inner zones located between the inner edge of the substrate and a radial position approximately 15 mm apart from the inner edge of the substrate.

A preferable disk format according to the second aspect of the present invention is determined as follows:
(1) Data storage area is divided into a plurality of concentric zones or bands;
(2) Number of sectors per one physical track (or one revolution) in the innermost zone is determined such that the shortest mark length for the unit mark is equal to or slightly larger than the minimum mark length;
(3) Number of sectors per one physical track in each zone other than the innermost zone is a sum of an integer and the number of sectors per one physical track in the adjacent inner zone located at the inner periphery of the each zone, and the integer may be selected at 1, for example; and
(4) Radius of the outer periphery of each zone is selected such that the shortest mark length in the adjacent outer zone located at the outer periphery of the each zone is equal to or longer than the minimum mark length.

The following discussion applies to the magneto-optical disk according to the second aspect, when a physical track format is employed for the magneto-optical disk. The physical track format is disclosed in, for example, U.S. Pat. No. 5,293,565 and U.S. Pat. No. 5,418,773, description in both of which is incorporated herein by reference. The physical track as used herein is referred to as a track corresponding to one revolution of the disk, i.e., corresponding to 360 degrees during rotation of the disk. If a MCAV format is employed, number of sectors per one physical track monotonically increases zone by zone as viewed toward the outer periphery of the disk. The logical track as used herein is referred to as a unit track portion having a specified number of sectors therein. By suitably designing a disk format such that all of the zones have a specified number of logical tracks in each of the zones, the disk drive can control the sectors by a common procedure throughout the data area. Accordingly, each zone is generally composed of several physical tracks, and the number of physical tracks in each zone is determined such that integral multiples of logical tracks are included in integral multiple of the physical tracks in each zone. It is to be noted that if one logical track includes therein only one sector, it is equivalent to not employing a logical track format.

If a logical track format is to be employed, the outermost radius in each zone should be the minimum radius which exceeds the outermost radius of the each zone obtained by the method as described above and in which integral multiple of the logical tracks are received in integral multiple of the physical tracks. If an outermost radius thus obtained exceeds the radius of the data storage area, the outermost radius is determined to be the outermost radius of the data storage area itself, and the zone providing such an outermost radius is determined to be the outermost zone. In the logical track format, the outermost radius of the outermost zone is determined at the maximum radius which does not exceed the outermost radius thus obtained and allowing integral multiple of the logical tracks to be included in integral multiple of the physical tracks.

When the data storage area is composed of M zones (M>1) dividing the data storage area based on the radial positions thereof and the shortest mark lengths in all of the zones is determined at a fixed mark length (Lmin), the disk format of the optical disk according to the second aspect of the present invention may be decided according to the following procedures:

Assuming that track pitch, number of channel bits per one sector, channel bit length of the unit mark, number of sectors per one physical track increased or decreased from the number of the sections per one physical track in the adjacent zone, number of sectors per one logical track, and the radii of the innermost and outermost tracks in the data area are represented by Tp, Nc, Nmin, L, Nlsct, and Rin and Rout, the number N[k] of sectors per one revolution in kth zone, the radius Rstart[k] of the innermost track in the kth zone, the radius Rstop[k] of the outermost track in the kth zone, and the number Nrev[k] of physical tracks in the kth zone are determined in each of the following zones: (1) 1st, innermost zone where k=1, (2) kth zone for $2 \leq k \leq M-1$, (3) Mth, outermost zone where k=M, as follows:

(1) for k=1:

Rstart[1]=Rin,

N[1] is determined by a maximum integer not exceeding $\{2\pi \cdot Rstart[1]/((Lmin/Nmin) \cdot Nc)\}$, and Nrev [1] is determined by a product of Nlsct and a maximum integer not exceeding $\{Lmin/Nmin \cdot Nc \cdot (N[1]+L)/(2\pi)-Rstart[1]\}/Tp/Nlsct+1$, and Rstop[1]=Rstart[1]+Nrev·Tp, (2) for k=2 to k=M−1:

Rstart[k]=Rstop[k−1]+Tp,

N[k]=N[k−1]+L,

Nrev[k] is determined by a product of Nlsct and a maximum integer not exceeding $\{Lmin/Nmin \cdot Nc(N[k]+L)/(2\pi)-Rstart[k]\}/Tp/Nlsct+1$, and Rstop [k]=Rstart[k]+Nrev[k]·Tp, and (3) for k=M:

Rstart[M]=Rstop [M−1]+Tp,

N[M]$\leq$N[M−1]+L,

Nrev[M] is a determined by a product of Nlsct and a maximum integer not exceeding $\{Rout-Rstart[M]\}/Tp/Nlsct$, and Rstop[M]=Rstart[M]+Nrev[M]·Tp.

Usually, there is a possibility that the outermost zone is inferior to other zones in mechanical characteristics due to the surface deflection or warp of the disk and in recording/reproducing characteristics due to birefringence of the substrate and deviation from the optimum film thickness or optimum film composition in the recording film. In this respect, the recording/reproducing characteristics can be improved by enlarging the shortest track length in the at least one outer zone including the outermost zone to be more than the shortest mark length in the other zones, to thereby enable the effective use of the at least one outer zone, which could not be practically used in the conventional optical disk. To achieve this configuration, the difference between the number of sectors in the zone and the number of the sectors in the adjacent inner zone may be reduced from the fixed number assigned to the other zones.

Alternatively, if the shortest mark length in kth zone is designed at Lmin[k] for each of the respective zones in the data storage area composed of M zones (M>1), the disk format of the optical disk according to the second aspect may be decided according to the following procedures:

Assuming that track pitch, the number of channel bits per one sector, number of sectors per one logical track, and the radii of the innermost and outermost tracks in the data area are Tp, Nc, Nlsct, and Rin and Rout, respectively, the number N[k] of sectors per one revolution in the kth zone, the radius Rstart [k] of the innermost track, the radius Rstop[k] of the outermost track, and the number Nrev of physical tracks are determined in each of the following zones: (1) first, innermost zone where k=1, (2) kth zone for $2 \leq k \leq M-1$, (3) Mth, outermost zone where k=M, as follows.

(1) for k=1:

Rstart[1]=Rin,

N[1] is determined by a maximum integer not exceeding $\{2\pi \cdot Rstart[1]/(Lmin[k]/Nmin \cdot Nc)\}$, Nrev [1] is determined by a product of Nlsct and a maximum integer not exceeding $\{Lmin[k]/Nmin \cdot Nc \cdot (N[1]+L)/(2\pi)-Rstart[1]\}/Tp/Nlsct+1$, and Rstop[1]=Rstart[1]+Nrev[1]·Tp, (2) for k=2 to k=M−1:

Rstart[k]=Rstop[k−1]+Tp,

N[k]=N[k−1]+L,

Nrev[k] is determined by a product of Nlsct and a maximum integer not exceeding $\{Lmin[k]/Nmin \cdot Nc(N[k]+L)/(2\pi)-Rstart[k]\}/Tp/Nlsct+1$, and Rstop[k]=Rstart[k]+Nrev[k]·Tp, and (3) for k=M:

Rstart[M]=Rstop[M−1]+Tp,

N[M]=N[M−1]+L,

Nrev[M] is determined by a product of Nlsct and a maximum integer not exceeding $\{Rout-Rstart[M]\}/Tp/Nlsct$, and Rstop[M]=Rstart[M]+Nrev[M]·Tp.

When the above procedure is employed, the maximum data storage density can be obtained. Moreover, if the maximum integer, which is obtained during calculation of the number (Nrev) of physical tracks based on the above-mentioned procedure, is selected within the range of ±3, nearly the maximum value for the data storage density can be obtained.

BRIEF DESCRIPTION OF THE DRAWINGS

FIG. 5 is a table for showing the configuration of a first embodiment according to the present invention;

FIG. 6 is a table for showing the configuration of a first comparative example;

FIG. 7 is a table for showing the configuration of a second comparative example;

FIG. 10 is a table for showing the configuration of a magneto-optical disk according to a modified embodiment from FIG. 4;

FIG. 11 is a table for showing the configuration of a magneto-optical disk according to a second embodiment of the present invention;

FIGS. 13 to 16 are tables for showing the configurations of magneto-optical disks according to a third to sixth embodiments, respectively, of the present invention; and FIG. 17 is a table for showing the configuration of a third comparative example.

PREFERRED EMBODIMENTS OF THE INVENTION

Now, the present invention will be more specifically described based on preferred embodiments thereof with reference to the accompanying drawings.

Figure 4A:
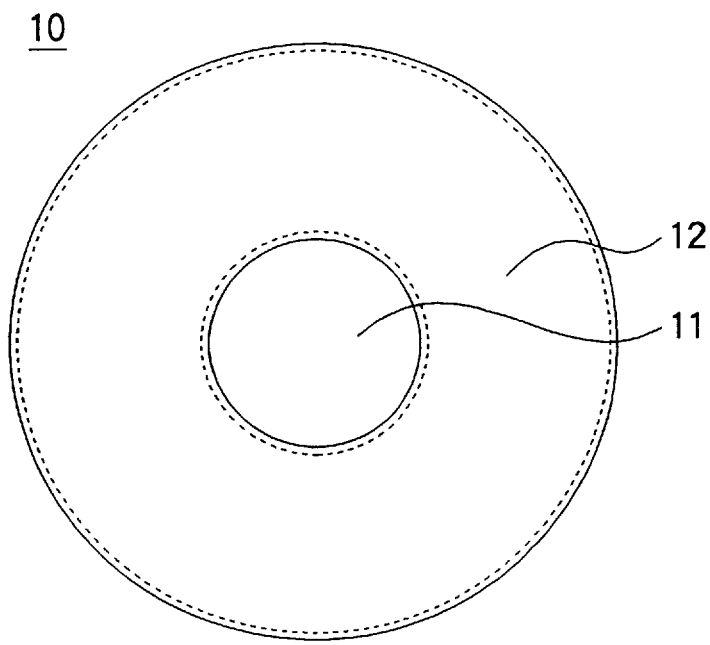
FIGS. 4A and 4B are a plan view and a sectional view, respectively, of a magneto-optical disk implementing an example of an optical disk according to the present invention.

FIGS. 4A an 4B show a structure of a magneto-optical disk implementing an optical disk according to the present invention. The magneto-optical disk generally designated at numeral 10 comprises a central, circular hub portion 11 and an annular disk portion 12 disposed at radially outside the hub portion 11. The outer diameter of the disk portion 12 is, for example, 131 mm and the inner diameter thereof is, for example, 25 mm. The disk portion 12 comprises an annular disk substrate 13, and a magneto-optical recording film 14 and a protective film 15 consecutively formed on the disk substrate 13 by sputtering and spin-coating techniques, respectively. The hub portion 11 is attached by an adhesive to an opening of the disk substrate 13 having a diameter of 15 mm.

Magneto-optical recording film 14 is of an annular shape having an inner edge at 9 mm apart from the inner edge of the disk portion 12 in the radially outward direction and an outer edge at 2 mm apart from the outer edge of the disk portion 12 in the radially inward direction. The magneto-optical recording film 14 has a user's data area for allowing a user to record/reproduce data therein and a control data area disposed radially outside and/or inside the user's data area, although both areas are not specifically shown. The control data area stores data for the physical characteristics of the disk.

Data tracks are formed with 0.85 mm pitch on the magnetooptical recording film 14 beforehand according to the disk format during the fabrication process for the magneto-optical disk. The data tracks are divided into 50 zones (or bands), for example, based on the radial position to adapt to an magneto-optical recording/reproducing operation by a disk drive using a MCAV system. Each zone has therein a fixed number of sectors per one revolution in accordance with the preferred embodiment of the present invention, and a recording/reproducing operation by a mark edge system using a (1,7) RLL (run length limit) code is effected to each sector by the user.

First Embodiment

FIG. 5 shows the number of sectors in each zone on the magneto-optical disk implementing an optical disk according to the first aspect of the present invention. The data storage area resides between the radial positions at 27.00 mm and 63.00 mm, and includes 50 zones for data storage each having sectors per revolution in number between 37 and 84. The number of sectors per revolution generally increases monotonically as viewed in the radially outward direction and modified in the outermost edge portion and innermost edge portion of the disk. The storage capacity of each sector is set at 1410 bytes, among which 1024 bytes are for the user.

The first, innermost zone starts at 27.00 mm from the center and ends at 27.72 mm from the center. The number of sectors per revolution in the first zone is 37 which is the minimum among all of the zones. The second zone starts at 27.72 mm and ends at 28.84 mm. The number of sectors per revolution in the second zone is 38 which is increased by one from the number of sectors in the first zone. Similarly, the number of sectors increases one by one towards the outer zones to result 84 sectors per revolution in the outermost, 50th zone. The 50th zone starts at 62.28 mm and ends at 63.0 mm. The storage capacity of the magneto-optical disk of the present embodiment is 2.705 giga-bite (GB) or 2705 MB.

The majority of zones, that is, 4th to 48th zones, have substantially an equal storage density by designing such that each zone has a number of sectors per revolution which is increased by one from the number of sectors per revolution in the adjacent, inner zone. This is shown by the shortest mark length residing in the range from 0.528 μm to 0.531 μm, and also by the longest mark length residing in the range from 0.555 μm to 0.538 μm in each of the 4th to 48th zones.

However, it is to be noted that the number of sectors per revolution in the 48th zone in the vicinity of the outer edge is same as that in the 49th zone which is adjacent to the 48th zone in the radially outward direction. That is, the number of sectors per revolution in each of the outer zones in the vicinity of the outer edge of the disk is reduced compared to the other zones to thereby reduce the recording density in the outer zones. Similarly, the difference in the number of sectors per revolution between the 3rd zone and 4th zone is set at two, to thereby reduce the recording density in the zone in the vicinity of the inner edge of the disk compared to the other zones.

The present embodiment shows an example wherein the constants $k_1$ and $k_2$ are determined as $k_1=48$ and $k_2=3$. It is to be noted that k assumes an integer between 1 and 50 for each zone to provide the number N(k) of sectors per revolution in the zone. For k which is between 1 and 3, N(k+1)>N(k)+1 holds for k=3, and N(k+1)=N(k)+1 holds for k=1 or 2. N(k+1)=N(k)+1 holds for k between 4 and 47. Further, for k=48 or k=49, N(k+1)<N(k)+1 holds for k=48, and N(k+1)=N(k)+1 holds for k=49.

As described above, by reducing the number of sectors per revolution in the inner and outer zones disposed in the vicinity of the inner and outer edges to thereby determine a low recording density therein, excellent recording/ reproducing characteristics can be obtained in the zones in the vicinity of the inner and outer edges of the disk, wherein the physical characteristics of the recording film are generally deteriorated. Enlargement of the recording area in the magneto-optical disk is thus obtained together with reliable recording/reproducing characteristics.

In a modified configuration from the first embodiment, 48th zone and 49th zone, wherein the numbers of sectors per revolution in both the zones are equal, are regarded as a single zone. FIG. 10 shows the modified configuration. In particular, when two zones as combined have smaller zone width compared to double width of the other zones, the two zones should be handled as a combined zone because the variation or difference in the recording/reproducing characteristics is small within the two zones.

FIG. 6 and FIG. 7 show, similarly to FIG. 5, first and second comparative examples, respectively, for comparison of the present embodiment against the comparative examples.

The first comparative example shown in FIG. 6 illustrates a conventional magneto-optical disk, wherein the data storage area is not installed in the vicinity of the outer and inner edges of the magneto-optical recording film because of the inferior physical characteristics compared to the other zones. Therefore, the data storage area is installed between 30.0 mm and 60.01 mm at the radial position. As a result, the entire number of zones remains at 42. The number of sectors per revolution in each zone is increased monotonically as viewed in the radial direction without exception. The number of sectors per revolution in one zone is increased by one whenever the zone number increases. The numbers of sectors per revolution are 42 in the innermost zone and 83 in the outermost zone, respectively. In the first comparative example, the shortest mark length of the unit mark is 0.530 µm, and longest mark length of the unit mark is in the range from 0.537 µm to 0.543 µm. The shortest mark length is set at a constant in this example in consideration of the recording characteristics. The storage capacity of the first comparative example remains at 2.259 GB, which is as low as about 83% of the first embodiment. That is, the storage capacity increases by about 20% in the first embodiment compared to the conventional magneto-optical disk.

Figure 1:
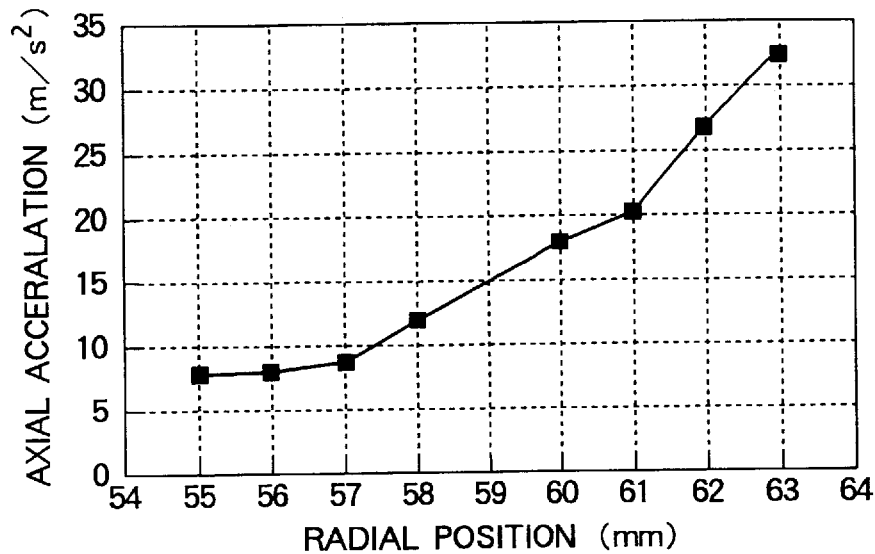
FIG. 1 is a graph showing radial position dependency of acceleration in the axial direction of the recording surface in a typical optical disk.
Figure 2:
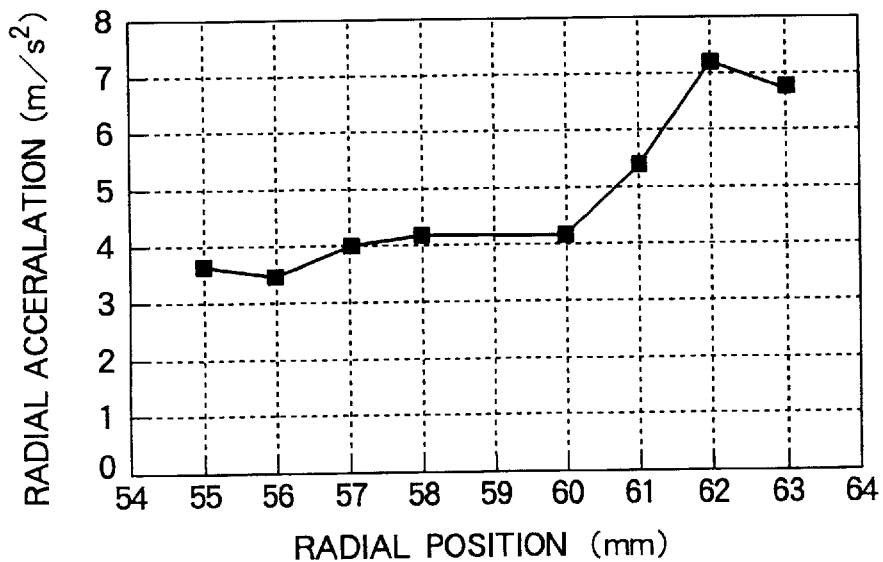
FIG. 2 is a graph showing radial position dependency of acceleration in the radial direction of the track in the typical optical disk.
Figure 3:
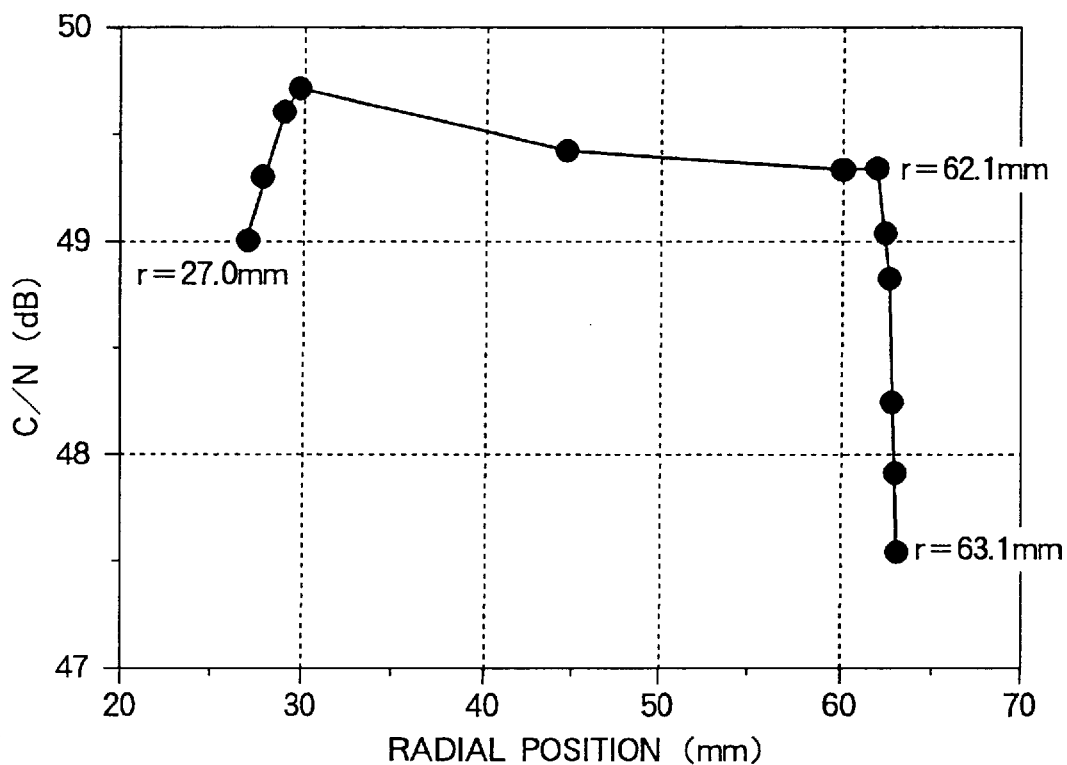
FIG. 3 is a graph showing radial position dependency of CN ratio in the typical optical disk.
Figure 4B:
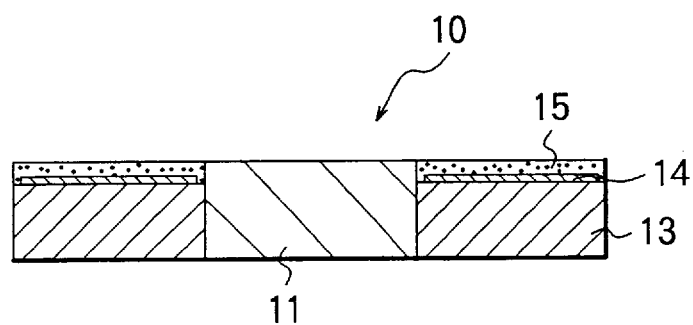

The second comparative example shown in FIG. 4 has a zone configuration similar to that of the first embodiment. The data area is installed within the range from 27.00 mm to 63.00 mm at the radial position. However, the number of sectors in each zone is increased monotonically without exception as viewed toward radially outward direction, which is similar to the first comparative example shown in FIG. 3. The shortest mark length resides in the range from 0.527 µm and 0.531 µm, and the longest mark length resides in the range from 0.538 µm from 0.542 µm. The storage capacity of the second comparative example is 2.711 GB, which is larger than the first embodiment only by about 0.2%

Samples for the magneto-optical disks according to the first embodiment and of the second example were manufactured, both having thereon highest density data wherein unit marks and unit spaces are arranged alternately in each land or groove area constituting a track. The unit mark and unit space are generally defined as a specific mark and a specific space corresponding to a shortest pulse duration and a shortest pulse interval, respectively, among the marks or spaces to be recorded in the optical disk. The optical disks thus manufactured were subjected to a test for measuring recording/reproducing characteristics thereof. Recording of the data was executed by a laser light having a polarization direction parallel to the groove on the substrate. The recording and reproduction of the data are executed in a disk tester under the following condition: 680 nm for the wavelength of the reproducing laser, 0.55 for the numerical aperture of the objective lens in the measurement, 9.42 m/s for the liner velocity of the track, 23.9 kA/m (or 300 oersted) for the recording magnetic field, 37.5% for the duty ratio of the recording laser power, 7.0 mW for the erasing laser power, 1.0 mW for the bottom output of the recording laser power, and 1.5 mW for the reproducing laser power. The recording laser power is selected such that the CN ratio is maximum at each radial position.

Figure 8:
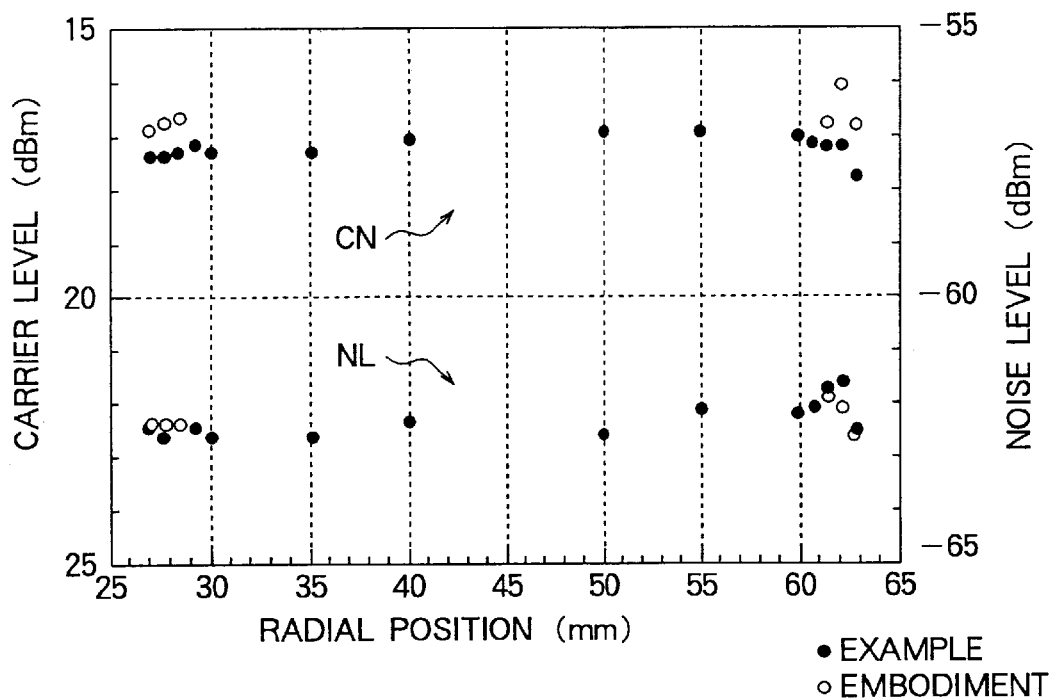
FIG. 8 is a graph showing radial position dependency of carrier level and noise level in the optical disks according to the embodiment and comparative example.
Figure 9:
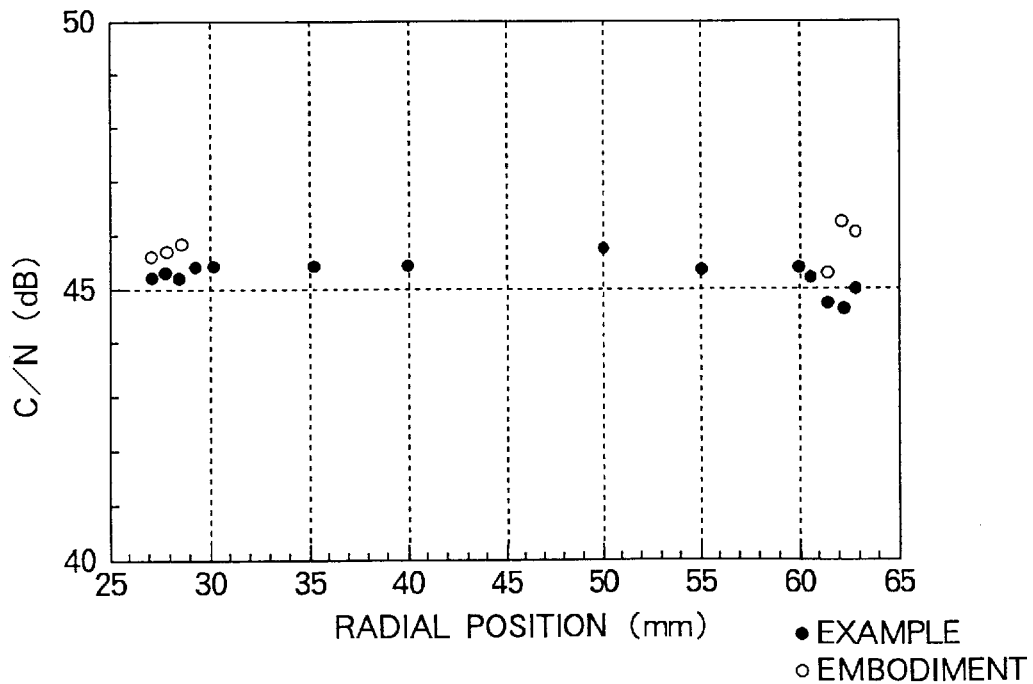
FIG. 9 is a graph showing radial position dependency of CN ratio in the optical disks according to the embodiment and comparative example.

The disk characteristics were measured by sampling at selected part from the disk area in the second comparative example, and measured in the first embodiment at the 1st to 3rd zones and at the 48th to 50th zones, i.e., the zones wherein the number of sectors per revolution is different from the second comparative example or the zones which are adjacent to such zones. FIGS. 8 and 9 show the results of the measured characteristics, wherein FIG. 8 shows the data for the carrier level CL and noise level NL in both the disks and FIG. 9 shows the comparison of CN ratio in both the disks. In general, the CN ratio of 45 dB or more is preferred in the magneto-optical disk to prevent an occurrence of error in the reproduced signal.

In FIG. 8, according to the first embodiment, a relatively larger carrier level CL is obtained in the vicinity of both the inner and outer edges of the disk compared to the second comparative example, and the noise level is substantially same in the vicinity of the inner edge of the optical disk as in the comparative example and is lower in the vicinity of the outer edge. As a result, as shown in FIG. 9, the CN ratio in the output signal from the first embodiment is higher than the critical level of 45 dB even in the vicinity of the inner and outer edges of the disk. On the other hand, in the comparative example, the CN ratio is lower than 45 dB in the vicinity of the outer edge and is lower in the vicinity of the inner edge than that in the first embodiment.

When a conventional magneto-optical disk having a track pitch of 0.85 µm is tested for recording/reproducing characteristics by a disk tester using a laser beam having a wavelength of 680 nm and objective lens having a numerical aperture of 0.55, a mark having a mark length below 0.6 µm exhibits a CN ratio below 47 dB in the central region of the data area and exhibits 1 to 2 dB lower than the recited decibel in the vicinity of the inner and outer edges of the disk. That is, there is a possibility that the critical value of 45 dB is not obtained in the vicinity of the inner and outer edges of the disk in the conventional magneto-optical disk. In view of this, the present invention is particularly effective in an optical disk recorded with a shortest mark length equal to or below 0.6 µm.

The amount of cross-talk from the adjacent tracks is generally equal to or above −30 dB in the case of a track pitch equal to or above 0.9 mm, and equal to or above −25 dB in the case of a track pitch equal to or above 0.85 µm. If the cross-talk rises above −30 dB, the increased cross-talk reduces the noise margin in the output signal. Accordingly, the present invention is particularly effective to an optical disk having a track pitch equal to or below 0.9 mm.

In general, an optical disk has a defect management area, which stores information relating to defective sectors and allocated sectors (spare sectors) therefor, in the vicinity of inner or outer edge. If the data stored in the defect management area is not reproduced, it is impossible to access the data itself throughout the optical disk. Accordingly, if the vicinity of the outer or inner edge is used as the defect control area in the second comparative example, there is a possibility that the data stored in all of the data area cannot be reproduced due to the low CN ratio in the vicinity of the outer or inner edge.

As described above, the magneto-optical disk according to the first embodiment of the present invention has inner edge portion and outer edge portion as an additional data area, wherein the recording density is slightly reduced compared to the other portion. The inner edge portion and the outer edge portion, however, exhibit reliable recording/reproducing characteristics due to the reduced recording density, thereby effectively increasing the storage capacity of the magneto-optical disk.

Second Embodiment

FIG. 11 shows a disk format according to the second embodiment implementing the second aspect of the present invention. The disk format is determined according to the design rule as detailed below:

(1) Basic Format:
 Track pitch: 0.85 mm
 Data area: from 29.68 mm to 62.09 mm
 Number of sectors per logical track: 17
 Number of bites per sector: 1416
 Number of channel bits per byte: 12
 Number of channel bits per sector: 1416×12=16992

Figure 12:
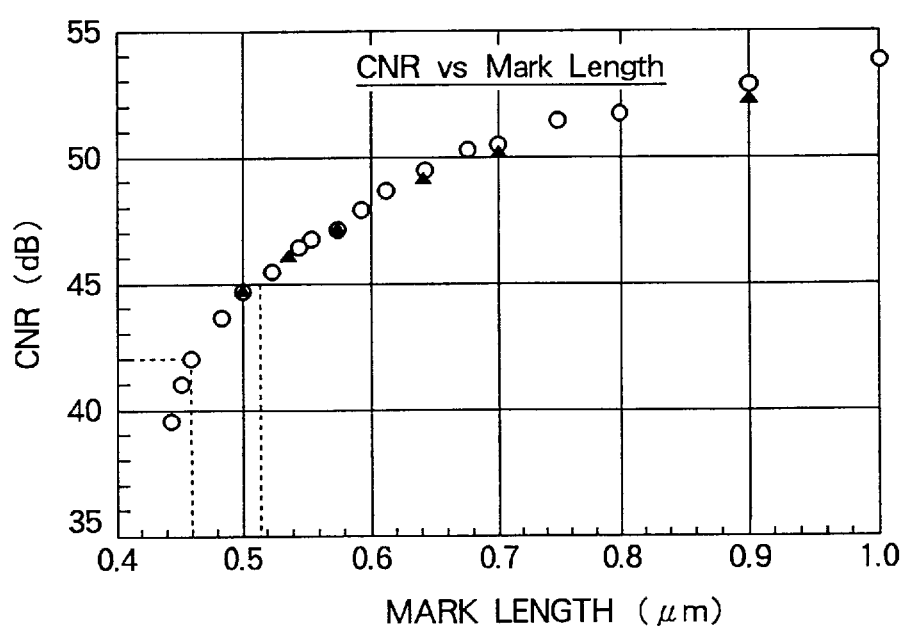
FIG. 12 a graph showing mark length dependency of CN ratio in the second embodiment.

(2) Minimum mark length:
 When a laser diode having a wavelength of 680 nm and an objective lens having a numerical aperture of 0.55 are used in a pickup unit, reproducing optical spot has a diameter of 1.15 mm. If a sufficient characteristic for recording/reproducing with a special data detection method, such as maximum likelihood, requires a CN ratio above 42 dB, at least 0.46 μm is needed in the mark length, as understood from FIG. 12. Alternatively, if a sufficient characteristic for a standard data detection method requires a CN ratio above 45 dB, at least 0.51 μm is needed in the mark length. In this text, these mark length 0.46 μm or 0.51 μm are each called a boundary mark length, and a minimum mark length should be a sum of the boundary mark length and a sufficient margin. In the present embodiment, 0.533 μm is selected for the minimum mark length to obtain a CN ratio above 45 dB.

(3) Design for the innermost, 0th zone:

The number of sectors per one physical track (or per one revolution) in the innermost zone is determined as a maximum integer which makes the shortest mark length larger than the minimum mark length 0.533 μm, that is, 41. As a result, a shortest mark length 0.535 μm, which is slightly above the minimum mark length 0.533 μm as mentioned above by a particular margin for the innermost zone, is selected for the shortest mark length in the innermost zone.

(4) Design for the 1st to 45th zones:

The number of sectors per one revolution in each zone is increased by one from the adjacent inner zone, and the shortest mark length in each zone is determined at the minimum mark length 0.533 μm. The number of physical tracks in each zone is determined from the shortest mark length and the number of sectors of the adjacent inner zone located at the outer periphery of the each zone.

In the present embodiment, the disk format is designed according to the condition as described above to obtain the table shown in FIG. 11. The magneto-optical disk of the present embodiment thus designed has a storage capacity of 2462.6 MB including the additional capacity obtained in 44th and 45th zones which are not used in a conventional magneto-optical disk. In FIG. 11 and FIGS. 13 through 17, zone number (Zone), radius of innermost track in each zone (RSTART), radius of outermost track in each zone (RSTOP), number of sectors per one revolution (SECTOR/REV), shortest mark length (MIN), longest mark length (MAX) and storage capacity of each zone in mega-byte (CAPACITY/ZONE) are tabulated in each row for the zone.

Third Embodiment

FIG. 13 shows a table for the third embodiment. In the present embodiment, the disk format is similar of the second embodiment except for the 45th zone of the present embodiment, wherein the number of sectors per physical track in 45th zone is reduced compared to the second embodiment and the shortest mark length in 45th zone is set at 0.539 μm, which is longer than the shortest mark length 0.533 μm in the innermost zone. The shortest mark length in 45th zone is thus set at a larger value in view of the inferior recording/reproducing characteristics in the outer edge portion of the magneto-optical disk compared to the other zones. In this configuration, reliable recording/reproducing characteristics can be obtained throughout the data area as well as a larger storage capacity for the disk, which accounts for 2462.5 MB.

Fourth Embodiment

FIG. 14 shows a table for the fourth embodiment. The present embodiment is similar to the second embodiment except that the number of sectors per revolution in each of 44th and 45th zones in the present embodiment is reduced by one compared to that in the second embodiment, and that the shortest mark length in each of the 44th and 45th zones is set at 0.539 μm in the present embodiment. The present embodiment achieves further reliable recording/reproducing characteristics and has a storage capacity of 2461.6 MB.

Fifth Embodiment

FIG. 15 shows a table for the fifth embodiment. The present embodiment is similar to the second embodiment except that the numbers of sectors per revolution in the 44th and 45th zones are reduced by one and two, respectively, compared to that in the first embodiment, and that the shortest mark lengths in the 44th and 45th zones are set at 0.539 μm and 0.546 μm, respectively. The present embodiment achieves more reliable recording/reproducing characteristics compared to the second embodiment and has a storage capacity of 2461.5 MB.

Sixth Embodiment

FIG. 16 shows a table for the sixth embodiment. The present embodiment is similar to the second embodiment except that the number of physical tracks in 43rd zone is increased up to 1649 which is obtained so that the shortest mark length in the outermost 44th zone is set at 0.539 μm and, as a result, substantially accounts for the zones in both the 43rd and 44th zones in the second embodiment. The present embodiment achieves more reliable recording/reproducing characteristics compared to the second embodiment and has a storage capacity of 2463.1 MB.

Third Comparative Example

The third comparative example shown in FIG. 17 is designed for comparison between the same and the second through sixth embodiments. The rule for design is as follows:

(1) The minimum mark length is set at 0.533 μm which enables a CN ratio above 45 dB, and the shortest mark length in the outermost 44th zone is set at the minimum mark length 0.533 μm.

(2) The number of physical tracks in each zone is set at a constant 833, as a result of which the shortest mark length in one zone is increased zone by zone or zone group by zone group as viewed toward the inner zones. The shortest mark length in the innermost zone is 0.544 μm which is larger than the minimum mark length 0.533 μm by 20%. The other configuration is similar to that in the second embodiment. The comparative example has a storage capacity of 2418.2 MB.

In the third comparative, although the data area is disposed between 29.68 mm and 62.10 mm, the storage capacity remains 2418.2 MB which is smaller than that of the second through sixth embodiments. The small storage capacity of the third comparative example is due to the fact that the number of physical tracks in one zone is set at the constant, and accordingly, the data area actually used therein is restricted between 30.14 mm and 62.00 mm by the rule that the shortest mark length in each zone must exceed the minimum mark length.

On the other hand, the data area in the second embodiment resides between 29.68 mm and 62.09 mm and is larger than in the third comparative example. Accordingly, the storage capacity of the second embodiment is larger than that of the third comparative example by about 2%. The third through fifth embodiments have more reliable recording/reproducing characteristics than the second embodiment in the zones disposed in the vicinity of the inner edge and/or outer edge, and yet each has a storage capacity compatible to the storage capacity of the second embodiment, which is above the storage capacity of the third comparative example by about 2%. The sixth embodiment has a data area disposed between 29.68 mm and 62.10 mm which is larger than the data area in the second embodiment, and accordingly has a storage capacity which is larger than the storage capacity of the second embodiment by 0.02%. The third through sixth embodiments have more reliable recording/reproducing capacity than the second embodiment. It can be stated that the third comparative example may have a larger storage capacity in the zones in the vicinity of the inner edge.

Although the present invention is described with reference to preferred embodiments thereof, the present invention is not limited thereto and various modifications or alterations can be easily made therefrom by those skilled in the art without departing from the scope of the present invention.

For example, although the embodiments are directed to magneto-optical disks having outer diameter of 130 mm, present invention may be also directed to an optical disk having 90 mm or other diameter.

What is claimed is:

1. An optical disk comprising a substrate and a recording layer formed on said substrate, said recording layer defining a data area divided into a plurality of ring-shaped zones, said zones including an innermost first zone through an outermost Mth zone arranged concentrically with each other, each of said zones including a plurality of physical tracks each divided into a plurality of sectors in the direction along the physical track, the improvement wherein a number $N(k+1)$ of sectors per physical track in $(k+1)$th zone is expressed in terms of number $N(k)$ of sectors per physical track in kth zone by the following relation:

for k=1 to k=$k_1$−1, $N(k+1)=N(k)+L$; and for k=$k_1$ to k=M−1, $N(k+1) \leq N(k)+L$ provided that $N(k+1)<N(k)+L$ holds for at least one of k's between $K_1$ and M−1, wherein L is a fixed integer and $K_1$th zone resides in the vicinity of said Mth zone.

2. An optical disk as defined in claim 1 wherein said $k_1$th zone resides between an outer edge of said optical disk and a radial position approximately 4 mm apart from the outer edge of said optical disk.

3. An optical disk as defined in claim 1 wherein said $k_1$th zone resides between an outer edge of said recording layer and a radial position approximately 2 mm apart from the outer edge of said recording layer.

4. An optical disk as defined in claim 1 wherein $k_1$=M−1.

5. An optical disk as defined in claim 1 wherein defect managing data are stored in said Mth zone.

6. An optical disk comprising a substrate and a recording layer formed on said substrate, said recording layer defining a data area divided into a plurality of ring-shaped zones, said zones including an innermost first zone through an outermost Mth zone arranged concentrically with each other, each of said zones including a plurality of physical tracks each divided into a plurality of sectors in the direction along the physical track, the improvement wherein a number $N(k+1)$ of sectors per physical track in $(k+1)$th zone is expressed in terms of number $N(k)$ of sectors per physical track in kth zone by the following relation:

for k=1 to k=$k_2$, $N(k+1) \leq N(k)+L$ provided that $N(k+1)>N(k)+L$ holds for at least one of k's between 1 and $k_2$, for k=$k_2$+1 to k=$k_1$−1, $N(k+1)=N(k)+L$, and for k=$k_1$ to k=M−1, $N(k+1) \leq N(k)+L$ provided that $N(k+1)<N(k)+L$ holds for at least one of k's between $K_1$ and M−1, wherein L is a fixed integer, $k_2$th zone and $K_1$th zone reside in the vicinity of said first zone and Mth zone, respectively.

7. An optical disk as defined in claim 6 wherein said $k_1$th zone and $k_2$th zone reside between an outer edge of said substrate and a first radial position approximately 4 mm apart from the outer edge of said substrate and between an inner edge of said substrate and a second radial position 15 mm apart from the inner edge of said substrate, respectively.

8. An optical disk as defined in claim 6 wherein said $k_1$th zone and $k_2$th zone reside between an outer edge of said recording layer and a radial position 2 mm apart from the outer edge of said recording layer and between an edge of an inner hole of said substrate and a radial position apart 22 mm from the edge of the inner hole of the substrate.

9. An optical disk as defined in claim 6 wherein k1=M−1 and k2=1.

10. An optical disk as defined in claim 6 wherein defect management data are stored in at least one of first zone and Mth zone.

11. An optical disk as defined in claim 6 wherein shortest mark length for a unit mark is equal to or smaller than 0.6 μm.

12. An optical disk as defined in claim 6 wherein track pitch for said track is equal to or smaller than 0.9 mm.

13. An optical disk as defined in claim 6 wherein said plurality of zones have substantially the same width.

14. An optical disk as defined in claim 6 wherein adjacent two of said zones having the same number of sectors per one physical track are combined as a single zone.

15. An optical disk in an optical disk drive, comprising a substrate and a recording layer formed on said substrate, said recording layer defining a data area divided into a plurality of ring-shaped zones, said zones including an innermost first zone through an outermost Mth zone arranged concentrically with each other, each of said zones including a plurality of physical tracks each divided into a plurality of sectors in the direction along the physical track, the improvement wherein:

each zone except for at least one specified zone disposed in the vicinity of at least one of inner and outer edges of said data area has sectors per one physical track in number equal to a sum of a fixed integer and a number of sectors per one physical track in an adjacent inner zone adjacent to said each zone; and a shortest mark length for a unit mark in said each zone is substantially equal to a minimum mark length, and a mark length for the unit mark in each track in said each zone is proportional to a radius of said each track.

16. An optical disk as defined in claim 15 wherein the shortest mark length in said innermost first zone is larger than the shortest mark length in other zones adjacent to said innermost first zone.

17. An optical disk as defined in claim 15 wherein the shortest mark length in said each zone resides between 1 and 1.005 times the minimum mark length.

18. An optical disk as defined in claim 17 wherein the shortest mark length in said at least one specified zone resides above 1.005 times the minimum mark length.

19. An optical disk as defined in claim 15 wherein the minimum mark length resides between 0.40 and 0.55 times a dimension of an optical spot formed in said optical disk drive.

20. An optical disk as defined in claim 15 wherein the minimum mark length resides between 1 and 1.25 times a boundary mark length for obtaining a specified CN ratio from said optical spot.

21. An optical disk as defined in claim 15 wherein said at least one specified zone is disposed between an outer edge of said substrate and a radial position approximately 4 mm apart from the outer edge of said substrate.

22. An optical disk as defined in claim 15 wherein said at least one specified zone is disposed between an outer edge of said recording layer and a radial position approximately 2 mm apart from the outer edge of said recording layer.

23. An optical disk as defined in claim 15 wherein said at least one specified zone is disposed between an inner edge of said substrate and a radial position approximately 15 mm apart from the inner edge of said substrate.

24. An optical disk as defined in claim 15 wherein said at least one specified zone is disposed within a radial position approximately 22 mm apart from an inner hole of said substrate.

25. An optical disk as defined in claim 15 wherein said fixed integer is 1.

* * * * *